US009193243B2

(12) United States Patent
Ono et al.

(10) Patent No.: US 9,193,243 B2
(45) Date of Patent: Nov. 24, 2015

(54) VEHICLE SUSPENSION SYSTEM

(75) Inventors: Yukihiko Ono, Tokyo (JP); Kenjiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/113,737

(22) PCT Filed: Apr. 27, 2011

(86) PCT No.: PCT/JP2011/060229
§ 371 (c)(1),
(2), (4) Date: Oct. 24, 2013

(87) PCT Pub. No.: WO2012/147174
PCT Pub. Date: Nov. 1, 2012

(65) Prior Publication Data
US 2014/0049012 A1 Feb. 20, 2014

(51) Int. Cl.
*B60G 17/019* (2006.01)
*B60G 17/02* (2006.01)

(52) U.S. Cl.
CPC ........ *B60G 17/01908* (2013.01); *B60G 17/021* (2013.01); *B60G 2204/421* (2013.01); *B60G 2300/22* (2013.01); *B60G 2400/051* (2013.01)

(58) Field of Classification Search
CPC ...... B60G 17/02; B60G 17/00; B60G 17/016; B60G 17/0165; B60G 3/00; B60G 5/00; B60G 9/00; B60G 2200/466; B60G 2500/30; B60G 2400/252
USPC ............. 280/5.514, 124.1, 124.105, 124.106, 280/124.107
See application file for complete search history.

(56) References Cited

U.S. PATENT DOCUMENTS

| | | | | |
|---|---|---|---|---|
| 4,909,535 A | * | 3/1990 | Clark et al. | ................ 280/5.515 |
| 5,291,406 A | * | 3/1994 | Williams et al. | ................ 701/37 |
| 5,716,067 A | | 2/1998 | Van der Knaap et al. | |
| 5,899,288 A | * | 5/1999 | Schubert et al. | ........... 180/89.12 |
| 6,036,201 A | * | 3/2000 | Pond et al. | ................. 280/5.514 |
| 7,648,148 B1 | * | 1/2010 | Mercier | ................ 280/124.103 |

(Continued)

FOREIGN PATENT DOCUMENTS

| | | |
|---|---|---|
| JP | 63-279912 A | 11/1988 |
| JP | 2-274608 A | 11/1990 |
| JP | 5-238225 A | 9/1993 |

(Continued)

OTHER PUBLICATIONS

International Search Report dated Jun. 7, 2011 w/ English translation (four (4) pages).
Japanese Office Action dated Mar. 24, 2015, with Partial English translation (Four (4) pages).

*Primary Examiner* — Paul N Dickson
*Assistant Examiner* — Darlene P Condra
(74) *Attorney, Agent, or Firm* — Crowell & Moring LLP

(57) ABSTRACT

To achieve a small and low power consumption suspension, which can be installed in a vehicle, such as a personal mobility vehicle, there is provided a vehicle suspension system including: a suspension that is connected to a vehicle body and a shaft mounted to wheels; an actuator that includes an output for vertically moving a suspension position of the suspension on the basis of inclination angle information of the vehicle; and a self-weight support mechanism that acts on the actuator to support vehicle weight. The self-weight support mechanism is composed of a spring mounted to the actuator, the actuator, and a link mechanism connected the suspension and the actuator.

11 Claims, 9 Drawing Sheets

(56) References Cited

U.S. PATENT DOCUMENTS

| | | | |
|---|---|---|---|
| 7,931,286 B2 * | 4/2011 | Melcher | 280/124.103 |
| 8,240,679 B2 * | 8/2012 | Kajino | 280/5.515 |
| 2003/0176119 A1 * | 9/2003 | Royle | 440/12.54 |
| 2005/0242532 A1 * | 11/2005 | Deo et al. | 280/5.5 |
| 2006/0267296 A1 * | 11/2006 | Dodd et al. | 280/5.512 |
| 2008/0258415 A1 * | 10/2008 | Melcher | 280/124.103 |
| 2009/0321168 A1 * | 12/2009 | Howell et al. | 180/197 |

FOREIGN PATENT DOCUMENTS

| | | |
|---|---|---|
| JP | 8-500786 A | 1/1996 |
| JP | 9-109644 A | 4/1997 |
| JP | 2005-59614 A | 3/2005 |
| JP | 2006-341748 A | 12/2006 |

* cited by examiner

F I G . 1
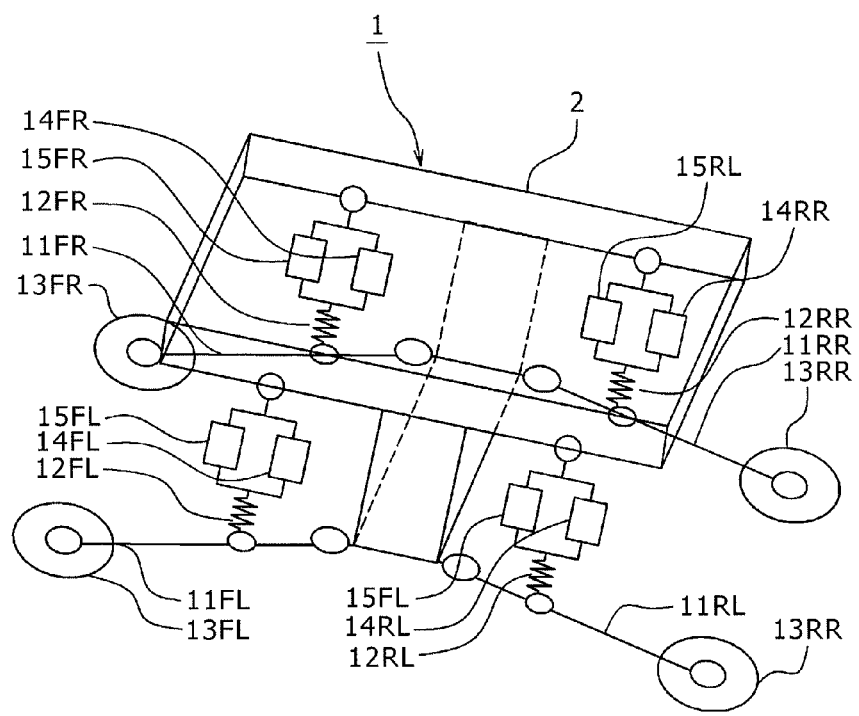
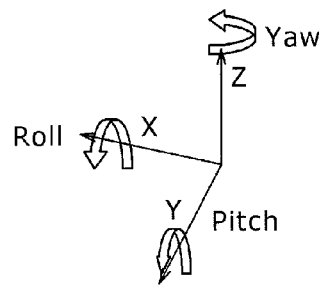

(a)

(b)

(c)

(d)

VEHICLE SUSPENSION SYSTEM

FIELD OF THE INVENTION

The present invention relates to a vehicle suspension system, which is a movement mechanism moving with wheels connected to a vehicle body frame for stably traveling on an uneven road surface by the wheels, and particularly, a vehicle suspension system suitable to be used for a movement mechanism for small vehicles.

BACKGROUND OF THE INVENTION

In vehicles, as a technology of stably traveling by absorbing unevenness or inclination of a traveling road surface, there is known a technology disclosed, for example, in the following Patent Literature 1.

The Patent Literature 1 discloses a movement mechanism which has wheels suspended from a vehicle body by a telescopic cylinder to properly control the stroke of the cylinder according to the inclination of the vehicle body.

DOCUMENTS ON PRIOR ART

Patent Document

Patent Document 1: Japanese Unexamined Patent Application Publication No. Hei9(1997)-109644

DISCLOSURE OF THE INVENTION

Problems to be Solved by the Invention

In a vehicle such as a personal mobility vehicle (small vehicle for one or two persons), an improvement in riding comfort, such as restraining vibration or swing and keeping the vehicle body horizontal even if there is unevenness or a level difference on a road surface, is important.

Therefore, in a movement mechanism moving with wheels connected to a vehicle body frame, it is necessary to absorb disturbances due to unevenness of a road surface and keep the vehicle body frame horizontal even on an inclined road surface to stably travel. Although shock due to unevenness of a road surface can be absorbed by a traditional suspension composed of a spring and a damper, when a vehicle is traveling on an inclined road surface, the vehicle body frame is inclined to the lower side of the inclined surface and cannot be kept horizontal. Furthermore, if a space between front and rear wheels or between right and left wheels of a personal mobility vehicle or the like is small, an amount of sinking of the suspension becomes larger on the front, rear, right or left side due to disturbances such as centrifugal force during cornering, or unevenness or inclination of a road surface, which is likely to lead to over-turning of the vehicle, resulting in a decrease in stability of the vehicle.

Therefore, in recent years, a technology of actively absorbing vibration with an actuator or keeping a vehicle body horizontal has been developed. For example, according to a method disclosed in the Patent Literature 1, the vehicle body is controlled so that it becomes horizontal, by detecting pitch and roll angles of the vehicle body with a sensor and driving an actuator of a suspension device mounted to four corners of the vehicle body. However, in the method disclosed in the Patent Literature 1, because it is always necessary to generate a driving force of the actuator during traveling on a flat road surface, causing increase in power consumption and an increase in the size of the mechanism, the problem is that it is difficult to install the mechanism in a small vehicle such as a personal mobility vehicle.

Accordingly, the present invention has been made to address the above-described problem, and an object of the present invention is to provide a vehicle suspension system capable of achieving a small and low power consumption suspension, which can be installed in a vehicle such as a personal mobility vehicle.

Solution to Problem

Means for Solving the Problem

A vehicle suspension system of the present invention includes: a suspension that is connected to a vehicle body and a shaft mounted to wheels; an actuator that includes an output for vertically moving a suspension position of the suspension on the basis of inclination angle information of the vehicle; and a self-weight support mechanism that acts on the actuator to support vehicle weight.

The self-weight support mechanism is composed of a spring mounted to the actuator, the actuator, and a link mechanism connected to the suspension and the actuator.

A control unit outputs a control command value to the actuator on the basis of the information received from an inclination sensor that is installed in a vehicle body frame for detecting an inclination angle to the direction of gravity and an inclination angle velocity of the vehicle, and controls the actuator so that the vehicle is set to a target inclination angle and a target inclination angle velocity.

In the present invention, at this time, the self-weight support mechanism supports the vehicle weight, and therefore there is an advantage that the output of the actuator to the suspension can be reduced.

Thus, according to the construction of the present invention, the vehicle suspension system allows reductions in output of the actuator and in size.

Advantageous Effects of the Invention

According to the present invention, it is possible to provide a vehicle suspension system capable of achieving a small and low power consumption suspension which can be installed in a vehicle such as a personal mobility vehicle.

BRIEF DESCRIPTION OF DRAWINGS

FIG. 1 is a perspective view showing a configuration of a vehicle with a vehicle suspension system according to a first embodiment of the present invention.

DESCRIPTION OF EMBODIMENTS

Hereinafter, embodiments of the present invention will be described with reference to FIGS. 1 to 10.

First Embodiment

Hereinafter, a first embodiment of the present invention will be described with reference to FIGS. 1 to 8.

Firstly, an overview of a vehicle suspension system according to the first embodiment of the present invention will be given with reference to FIGS. 1 to 3.

FIG. 1 is a perspective view showing a configuration of a vehicle with the vehicle suspension system according to the first embodiment of the present invention.

Figure 2:
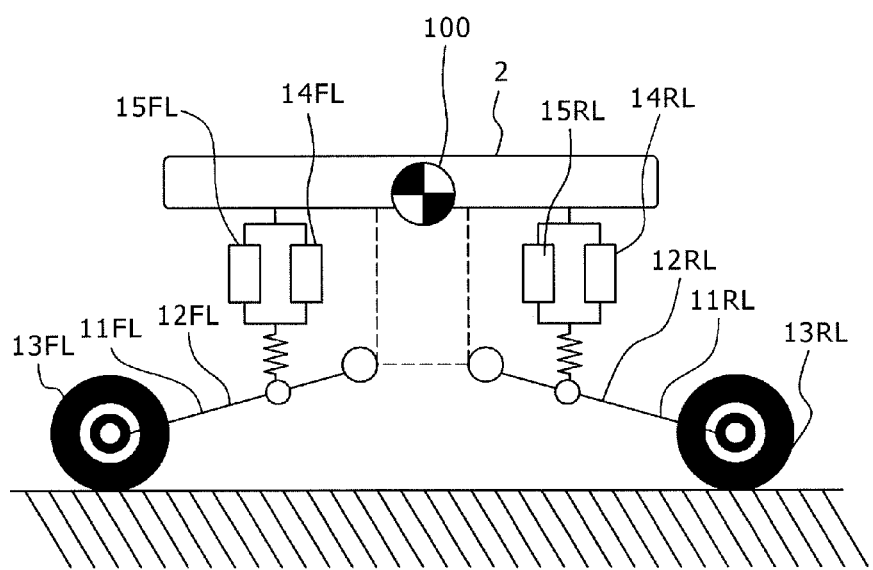
FIG. 2 is a side view (seen from the Y direction) showing the configuration of the vehicle with the vehicle suspension system according to the first embodiment of the present invention.
Figure 2:
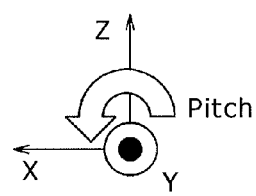

FIG. 2 is a side view (seen from the Y direction) showing the configuration of the vehicle with the vehicle suspension system according to the first embodiment of the present invention.

Figure 3:
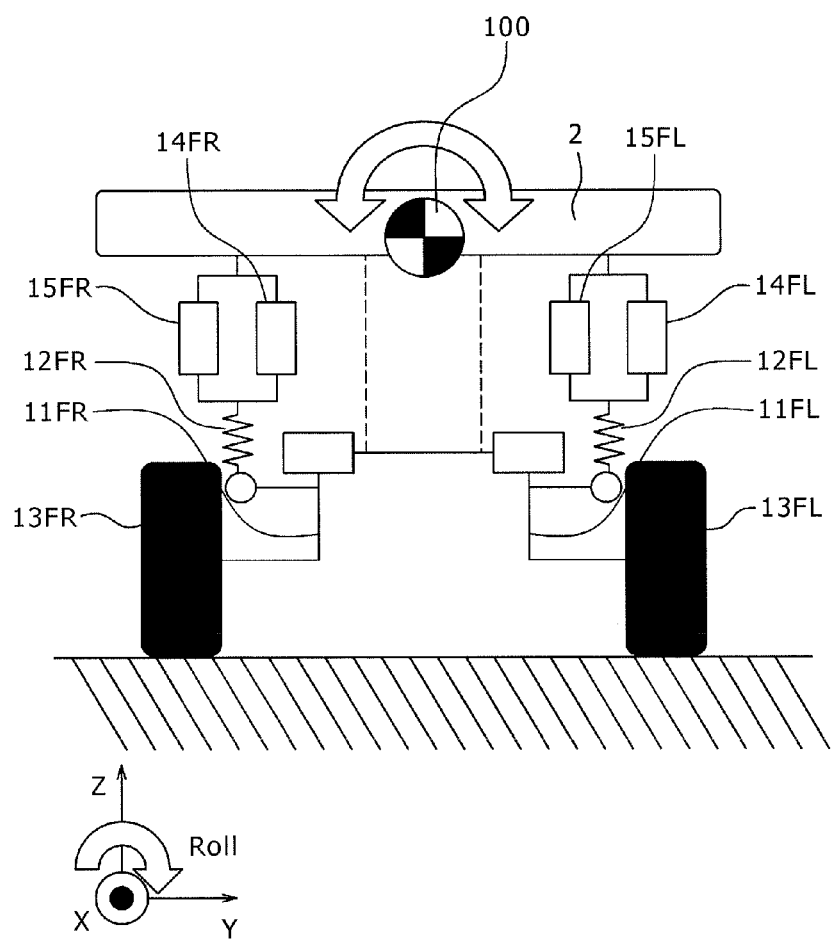
FIG. 3 is a front view (seen from the X direction) showing the configuration of the vehicle with the vehicle suspension system according to the first embodiment of the present invention.

FIG. 3 is a front view (seen from the X direction) showing the configuration of the vehicle with the vehicle suspension system according to the first embodiment of the present invention.

In this embodiment, for example, a boarding-type mobility-support robot in which a user rides to perform operation is used as a vehicle to be used for the vehicle suspension system.

As shown in FIG. 1, a vehicle suspension system 1 of the present invention includes four swing arms 11FL, 11FR, 11RL, and 11RR at four corners of a vehicle body 2 so that they can be turned in only a pitch direction. Wheels 13FL, 13FR, 13RL, and 13RR are provided at leading ends in a longitudinal direction of the swing arms 11FL, 11FR, 11RL, and 11RR.

Suspensions 12FL, 12FR, 12RL, and 12RR are connected to intermediate portions in the longitudinal direction of the swing arms 11FL, 11FR, 11RL, and 11RR, with degrees of freedom in the pitch direction. The other ends in a longitudinal direction of the suspensions 12FL, 12FR, 12RL, and 12RR are connected to linear actuators 14FL, 14FR, 14RL, and 14RR that are extendable in a vertical direction.

Furthermore, the other ends of the linear actuators 14FL, 14FR, 14RL, and 14RR are connected to the vehicle body 2, with degrees of freedom in the pitch direction. In addition, the linear actuators 14FL, 14FR, 14RL, and 14RR include self-weight support mechanisms 15FL, 15FR, 15RL, and 15RR for supporting the weight of the vehicle.

Here, it should be noted that a direction around an axis in a travel direction of the vehicle body 2 is referred to as the roll direction, and a direction around an axis perpendicular to the axis in the travel direction and parallel to a horizontal plane is referred to as the pitch direction, unless otherwise noted. Each of the linear actuators 14FL, 14FR, 14RL, and 14RR is extendable in a longitudinal direction and incorporates a power source (for example, a motor), a reduction gear, and an angle detector (a rotary encoder or a potentiometer) or a position detector (a linear encoder), to drive connected components.

Furthermore, suspension positions for suspending the suspensions 12FL, 12FR, 12RL, and 12RR on the vehicle body 2 are substantially symmetrical in relation to the axes having degrees of freedom in the pitch and roll directions of the vehicle body 2.

Also, the vehicle body 2, not shown, is mounted with an inclination sensor 101 for detecting an inclination angle to the direction of gravity and an angle velocity of the vehicle body 2.

The vehicle with the vehicle suspension system according to this embodiment as viewed from the Y direction is as shown in FIG. 2.

Here, the suspensions 12FL and 12FR, and 12RL and 12RR, each have the same elements and are each of symmetrical structure with respect to the X-Z plane passing through a centroid 100 of the mobility-support robot. Hereinafter, therefore, the suspensions 12FL and 12RL will be described.

The suspensions 12FL and 12RL are connected, with degrees of freedom in the pitch direction, to the intermediate portions of, respectively, the swing arms 11FL and 11RL connected between the wheel 13FL and the vehicle body 2 and between the wheel 13RL and the vehicle body 2. The other ends in the longitudinal direction of 12FL and 12RL are connected to the linear actuators 14FL and 14RL including the self-weight support mechanisms 15FL and 15RL, respectively. Further, the other ends of the linear actuators 14FL and 14RL are suspended from the vehicle body 2, with degrees of freedom in the pitch direction.

Here, the linear actuators 14FL and 14RL can output force in an extendable direction to thereby extend and contract the suspensions 12FL and 12RL and control the attitude in the pitch direction of the vehicle body 2.

Furthermore, the vehicle with the vehicle suspension system according to this embodiment as viewed from the X direction is as shown in FIG. 3.

The vehicle suspension system 1 has a symmetrical structure with respect to the Y-Z plane passing through the centroid 100 of the mobility-support robot. Hereinafter, therefore, the suspensions 12FL and 12FR will be described.

The suspensions 12FL and 12FR are connected, with degrees of freedom in the roll direction, to the intermediate portions of, respectively, the swing arms 11FL and 11FR connected between the wheel 13FL and the vehicle body 2 and between the wheel 13FR and the vehicle body 2. The other ends in the longitudinal direction of 12FL and 12FR are connected to the linear actuators including the self-weight support mechanisms 15FL and 15FR. Further, the other ends of the linear actuators 14FL and 14FR are suspended from the vehicle body 2, with degrees of freedom in the roll direction.

Here, the linear actuators 14FL and 14FR can output force in an extendable direction to thereby extend and contract the suspensions 12FL and 12RL and control the attitude in the roll direction of the vehicle body 2.

Next, the operation of the vehicle suspension system according to this embodiment will be described with reference to FIGS. 4 and 5.

Figure 4:
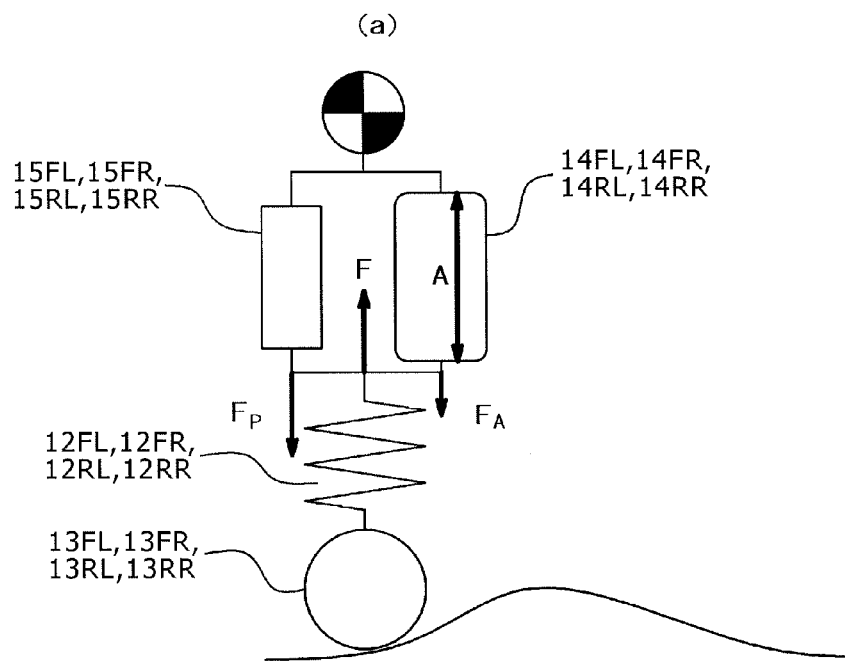
FIG. 4(a) is a view illustrating the operation of the vehicle suspension system according to the first embodiment of the present invention.
FIGS. 4(b) to 4(d) depict the relationship between force and time t during operation of the vehicle suspension system according to the first embodiment of the present invention.
Figure 4:
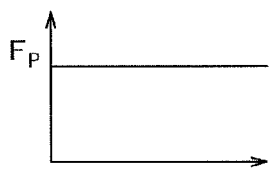
Figure 4:
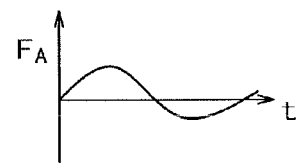
Figure 4:
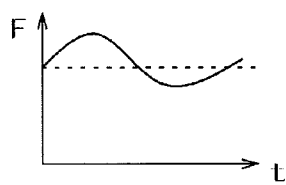

FIG. 4 is a view illustrating the operation of the vehicle suspension system according to the first embodiment of the present invention.

Figure 5:
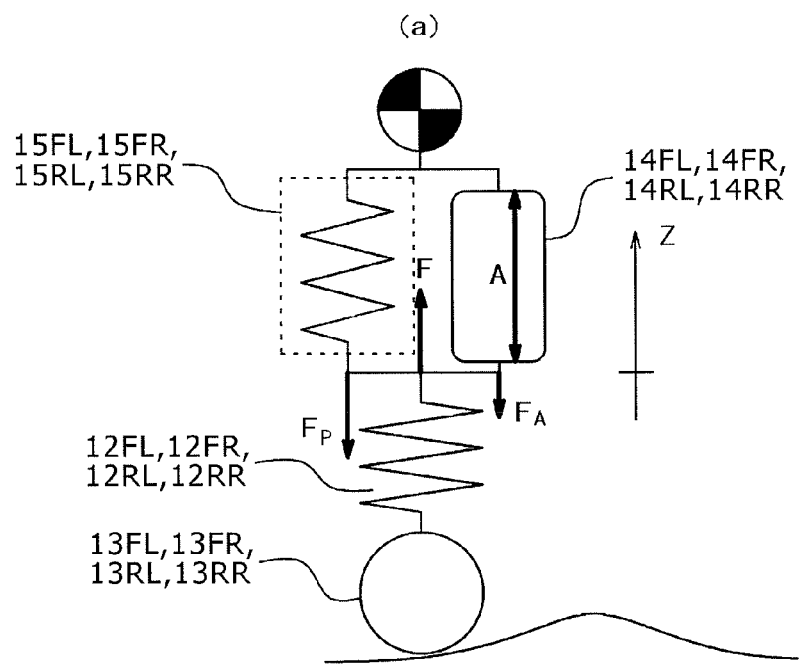
FIG. 5(a) is a view illustrating the operation in the case where a self-weight support mechanism is achieved by the use of only a spring provided in parallel to an actuator.
FIGS. 5(b) to 5(d) depict the relationship between force and a position Z during operation of the vehicle suspension system according to the embodiment of FIG. 5(a).
Figure 5:
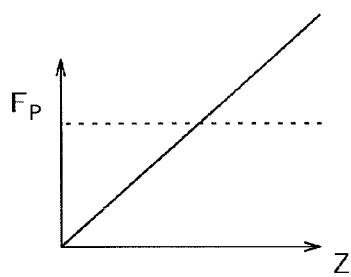
Figure 5:
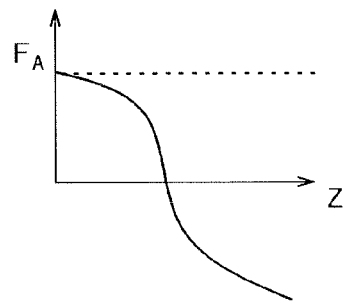
Figure 5:
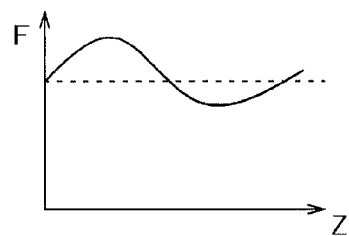

FIG. 5 is a view illustrating the operation in the case where the self-weight support mechanism is achieved by the use of only a spring provided in parallel to the actuator.

(a) in FIG. 4 shows force received by each portion of the vehicle suspension system, and (b) and (c) in FIG. 4 are each a graph showing the relationship between the force and time t.

When force F received by the suspensions 12FL, 12FR, 12RL, and 12RR from a road surface changes as shown in FIG. 4(d) with respect to the time t, the actuators 14FL, 14FR, 14RL, and 14RR only need to output force $F_A$ required for stabilizing the attitude of the vehicle as shown in FIG. 4(c) because the self-weight support mechanisms 15FL, 15FR, 15RL, and 15RR generate force for supporting the weight of the vehicle as shown in FIG. 4(b). Consequently, the motor output of the actuators 14FL, 14FR, 14RL, and 14RR can be significantly reduced as compared to the case without having the self-weight support mechanisms 15FL, 15FR, 15RL, and 15RR.

Meanwhile, the following problem occurs when achieving the self-weight support mechanism by the use of only a spring provided in parallel to the actuator.

(a) in FIG. 5 shows force received by each portion of the vehicle suspension system, and (b) and (c) in FIG. 5 are each a graph showing the relationship between the force and position Z.

That is, as shown in FIG. 5(a), in the case where the self-weight support mechanism is achieved by the use of only a spring provided in parallel to the actuator, force $F_P$ outputted by the spring changes as shown in FIG. 5(b) along with extension and contraction of the linear actuators 14FL, 14FR, 14RL, and 14RR. Therefore, as shown in FIG. 5(c), the force $F_A$ generated by the linear actuators 14FL, 14FR, 14RL, and 14RR should include an extra force equal to a difference between the force $F_P$ generated by the spring and the force for supporting the load of the vehicle.

Figure 6:
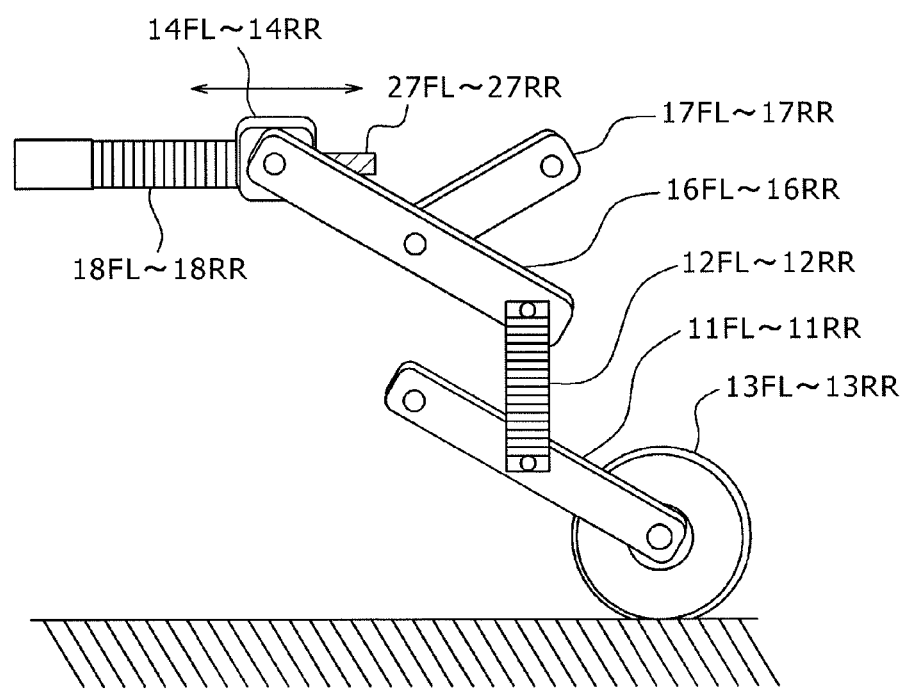
FIG. 6 is a view showing a mechanism composed of a combination of a spring and a link mechanism, serving as a self-weight support mechanism according to the first embodiment.
Figure 6:
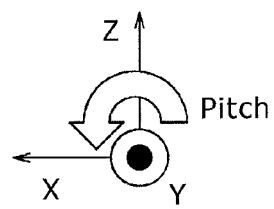

Therefore, in this embodiment, as shown in FIG. 6, the suspension system is achieved by a mechanism composed of a combination of a spring and a link mechanism which serves as the self-weight support mechanism.

FIG. 6 is a view showing a mechanism composed of a combination of a spring and a link mechanism, serving as a self-weight support mechanism according to the first embodiment.

As shown in FIG. 6, the vehicle suspension system 1 includes the four swing arms 11FL, 11FR, 11RL, and 11RR at four corners of the vehicle body 2 so that they can be turned in only the pitch direction. The wheels 13FL, 13FR, 13RL, and 13RR are provided at leading ends in the longitudinal direction of the swing arms 11FL, 11FR, 11RL, and 11RR. Also, the suspensions 12FL, 12FR, 12RL, and 12RR are connected to intermediate portions in the longitudinal direction of the swing arms 11FL, 11FR, 11RL, and 11RR, with degrees of freedom in the pitch direction. The other ends in the longitudinal direction of the suspensions 12FL, 12FR, 12RL, and 12RR are suspended on leading ends of links 16FL, 16FR, 16RL, and 16RR, with degrees of freedom in the pitch direction.

Furthermore, support links 17FL, 17FR, 17RL, 17RR are connected to intermediate portions in the longitudinal direction of the links 16FL, 16FR, 16RL, and 16RR, with degrees of freedom in the pitch direction. The other ends of the support links 17FL, 17FR, 17RL, 17RR are connected to the vehicle body 2, with degrees of freedom in the pitch direction (not shown).

On the other hand, ends in the longitudinal direction of the links 16FL, 16FR, 16RL, and 16RR opposite the wheels are connected, with degrees of freedom in the pitch direction, to the linear actuators 14FL, 14FR, 14RL, and 14RR that can be driven in a front-rear direction of the vehicle body 2.

Furthermore, the linear actuators 14FL, 14FR, 14RL, and 14RR are connected to leading ends of springs 18FL, 18FR, 18RL, and 18RR to slide on guides 27FL, 27FR, 27RL, and 27RR. Also, the other ends of the springs 18FL, 18FR, 18RL, and 18RR are connected to the vehicle body 2 (not shown).

Here, a force corresponding to the load of the vehicle can be transmitted to the suspensions 12FL, 12FR, 12RL, and 12RR by adjusting the spring constants of the springs 18FL, 18FR, 18RL, and 18RR and the link lengths of the link mechanisms, without relying on the extension and contraction of the linear actuators 14FL, 14FR, 14RL, and 14RR. In principle, therefore, the vehicle suspension system shown in FIG. 4(a) can be achieved.

With this mechanism, motor output can be reduced by about one fifth in the case of a single-passenger mobility-support robot, according to the measurement by the inventors.

It should be noted that the vehicle suspension system according to this embodiment has advantages, such as achieving miniaturization and preventing the portion of the actuator from moving along with the suspension, when compared with vehicle suspension systems according to second and third embodiments to be described later.

Next, control of the vehicle suspension system according to the first embodiment of the present invention will be described with respect to FIGS. 7 and 8.

Figure 7:
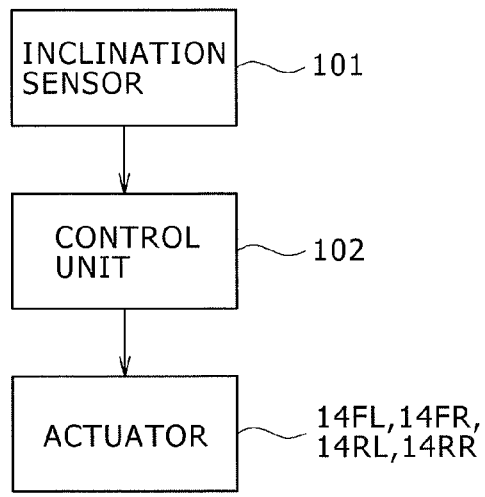
FIG. 7 is a view illustrating the relationship between control blocks and control flow of the vehicle suspension system according to the first embodiment of the present invention.

FIG. 7 is a view illustrating the relationship between control blocks and control flow of the vehicle suspension system according to the first embodiment of the present invention.

Figure 8:
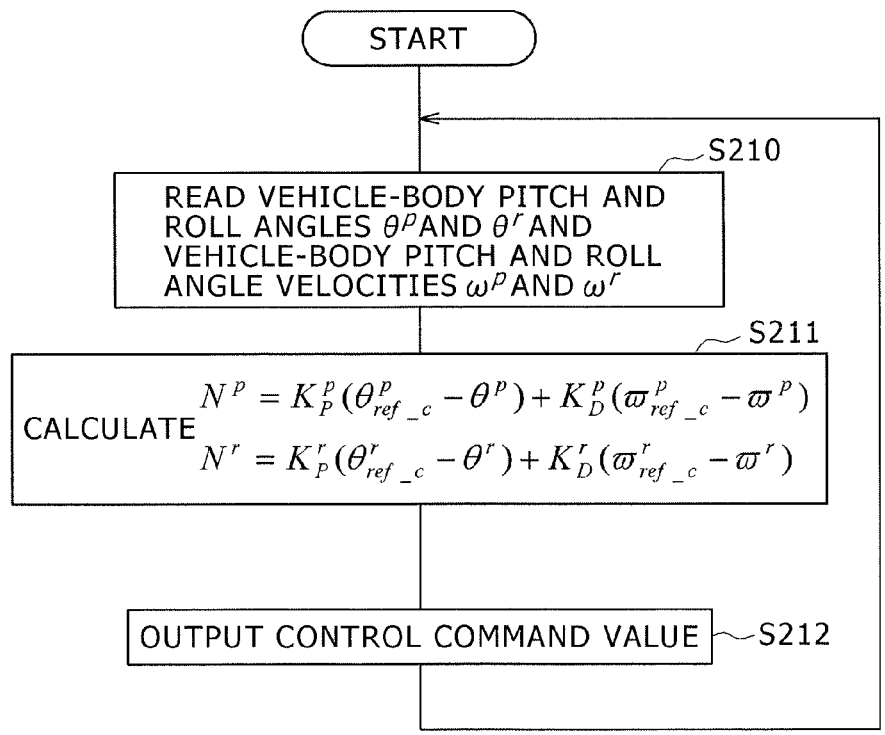
FIG. 8 is a flowchart showing control operations of the vehicle suspension system according to the first embodiment of the present invention.

FIG. 8 is a flowchart showing control operations of the vehicle suspension system according to the first embodiment of the present invention.

When the vehicle suspension system 1 shown in FIG. 1 travels on an uneven or inclined road surface or receives centrifugal force during cornering, the vertical vibration of the mobility-support robot is absorbed by the suspensions 12FL, 12FR, 12RL, and 12RR. However, if there is a difference in the amount of sinking between the left and right suspensions 12FL and 12FR and between the left and right suspensions 12RL and 12RR, the vehicle body 2 of the vehicle suspension system 1 is inclined to the side where the amount of sinking is large, and the return force causes pitch and roll vibrations. As shown in FIG. 7, the inclination sensor 101 (not shown in FIG. 1) is installed in the vehicle body 2 to detect an inclination angle to the direction of gravity and an angle velocity of the vehicle body 2. A control unit 102 (not shown in FIG. 1) installed in the vehicle body 2 properly controls the actuators 14FL, 14FR, 14RL, and 14RR on the basis of the information detected by the inclination sensor 101 so that the inclination and angle velocity of the vehicle body 2 coincide with target values.

This calculation process is executed at every predetermined sampling time ΔT. Firstly, vehicle-body pitch and roll angles $\theta^p$ and $\theta^r$ and vehicle-body pitch and roll angle velocities $\omega^p$ and $\omega^r$ are read from the inclination sensor 101 (S210). Then a value, obtained by multiplying differences between target vehicle-body pitch and roll angles $\theta^p_{rec\_c}$ and $\theta^r_{rec\_c}$ given in advance and the vehicle-body pitch and roll angles $\theta^p$ and $\theta^r$ with predetermined control gains $K^p_p$ and $K^r_p$, is added to a value obtained by multiplying differences between target vehicle-body pitch and roll velocities $\omega^p_{rec\_c}$ and $\omega^r_{rec\_c}$ given in advance and the vehicle-body pitch and roll angle velocities $\omega^p$ and $\omega^r$ with predetermined control gains $K^p_D$ and $K^r_D$ to calculate control torques $N_p$ and $N^r$ (S211). Finally, the control unit 102 outputs control forces $F_{FL}$, $F_{FR}$, $F_{RL}$, and $F_{RR}$ of the linear actuators 14FL, 14FR, 14RL, and 14RR to achieve the control torques $N^p$ and $N^r$ (S212).

As described above, with the vehicle suspension system according to this embodiment, the inclination detecting means installed in the vehicle body 2 detects an inclination angle to the direction of gravity and an angle velocity and inputs, to the actuator of the vehicle body, a predetermined control amount obtained from the inclination of the upper body and the angle velocity, thereby allowing reductions in the pitch and roll vibrations of the vehicle body and enabling stable travel. Furthermore, high-frequency vibrations exceeding the response performance of the actuator are absorbed by the spring and damper, and thus the vehicle body can be stabilized.

Second Embodiment

Hereinafter, a configuration of a vehicle suspension system according to a second embodiment of the present invention will be described with reference to FIG. 9.

Figure 9:
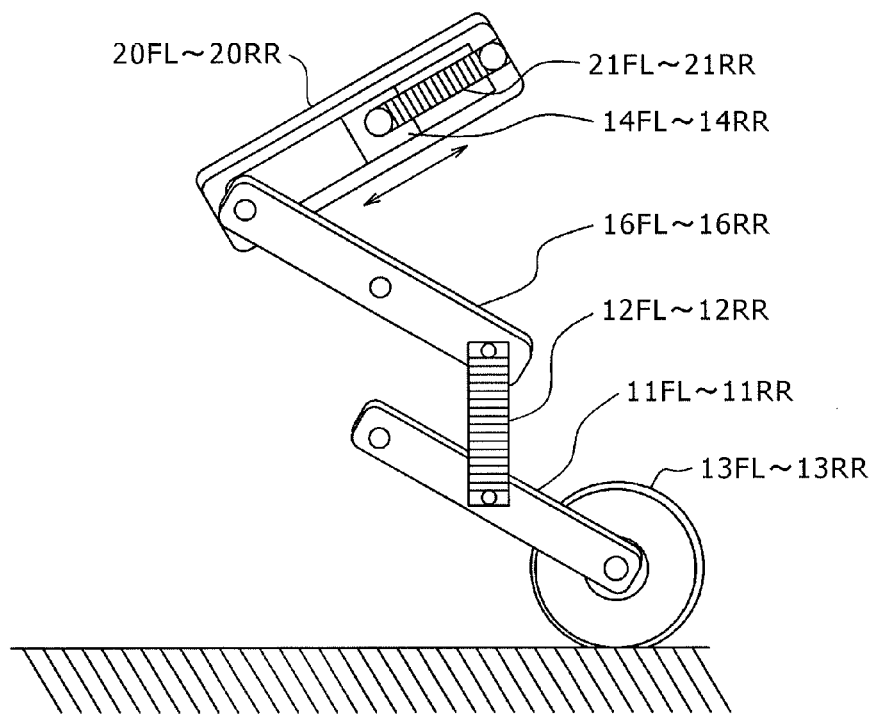
FIG. 9 is a view showing a mechanism composed of a combination of a spring and a link mechanism, serving as a self-weight support mechanism according to a second embodiment.
Figure 9:
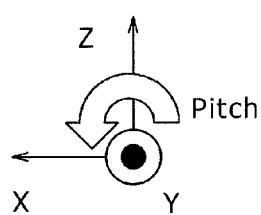

FIG. 9 is a view showing a mechanism composed of a combination of a spring and a link mechanism, serving as a self-weight support mechanism according to the second embodiment.

In this embodiment, as shown in FIG. 9, the wheels 13FL, 13FR, 13RL, and 13RR, the swing arms 11FL, 11FR, 11RL, and 11RR, the suspensions 12FL, 12FR, 12RL, and 12RR, and links 19FL, 19FR, 19RL, and 19RR have the same structures as those of the first embodiment.

However, in this embodiment, no support links are connected to intermediate portions in the longitudinal direction of the links 19FL, 19FR, 19RL, and 19RR.

Moreover, frames 20FL, 20FR, 20RL, and 20RR are connected to leading ends in the longitudinal direction of the links 19FL, 19FR, 19RL, and 19RR, with degrees of freedom in the pitch direction.

The linear actuators 14FL, 14FR, 14RL, and 14RR are movably embedded in the frames 20FL, 20FR, 20RL, and 20RR, and connected to the other ends of the frames 20FL, 20FR, 20RL, and 20RR by springs 21FL, 21FR, 21RL, and 21RR.

According to this embodiment, a force corresponding to the load of the vehicle can be transmitted to the suspensions 12FL, 12FR, 12RL, and 12RR by adjusting the spring constants of the springs 21FL, 21FR, 21RL, and 21RR and the link lengths of the link mechanisms, without relying on the extension and contraction of the linear actuators 14FL, 14FR, 14RL, and 14RR. In principle, therefore, the vehicle suspension system shown in FIG. 4(a) of the first embodiment can be achieved.

Third Embodiment

Hereinafter, a configuration of a vehicle suspension system according to a third embodiment of the present invention will be described with reference to FIG. 10.

Figure 10:
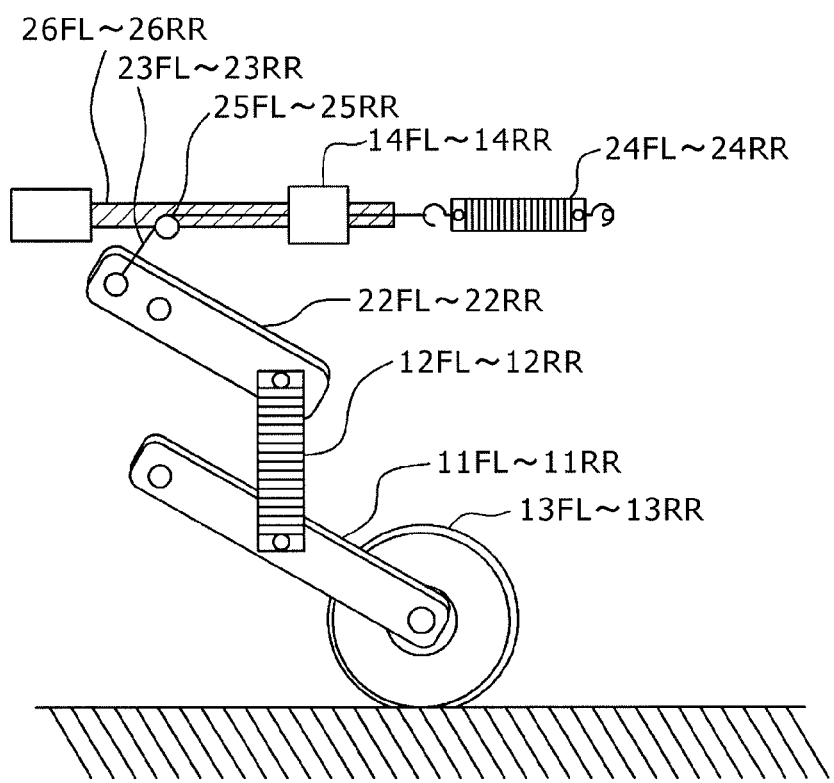
FIG. 10 is a view showing a mechanism composed of a combination of a spring and a link mechanism, serving as a self-weight support mechanism according to a third embodiment.

FIG. 10 is a view showing a mechanism composed of a combination of a spring and a link mechanism, serving as a self-weight support mechanism according to the third embodiment.

In this embodiment, as shown in FIG. 10, the wheels 13FL, 13FR, 13RL, and 13RR, the swing arms 11FL, 11FR, 11RL, and 11RR, the suspensions 12FL, 12FR, 12RL, and 12RR, and links 22FL, 22FR, 22RL, and 22RR have the same structures as those of the first and second embodiments.

However, in this embodiment, no support links are connected to intermediate portions in the longitudinal direction of the links 22FL, 22FR, 22RL, and 22RR.

Moreover, wires 23FL, 23FR, 23RL, and 23RR are connected to leading ends in the longitudinal direction of the links 22FL, 22FR, 22RL, and 22RR.

The wires 23FL, 23FR, 23RL, and 23RR are connected to the linear actuators 14FL, 14FR, 14RL, and 14RR through pulleys 25FL, 25FR, 25RL, and 25RR, the other ends of the wires 23FL, 23FR, 23RL, and 23RR being connected to springs 24FL, 24FR, 24RL, and 24RR.

The linear actuators 14FL, 14FR, 14RL, and 14RR slide on guides 26FL, 26FR, 26RL, and 26RR, thereby adjusting the lengths of the wires 23FL, 23FR, 23RL, and 23RR and changing the angles of the links 22FL, 22FR, 22RL, and 22RR to adjust forces to be transmitted to the suspensions 12FL, 12FR, 12RL, and 12RR.

According to this embodiment, a force corresponding to the load of the vehicle can be transmitted to the suspensions 12FL, 12FR, 12RL, and 12RR by adjusting the spring constants of the springs 24FL, 24FR, 24RL, and 24RR and the link lengths of the link mechanisms, without relying on the extension and contraction of the linear actuators 14FL, 14FR, 14RL, and 14RR. In principle, therefore, the vehicle suspension system shown in FIG. 4(a) of the first embodiment can be achieved.

EXPLANATION OF REFERENCE CHARACTERS

1 Vehicle suspension system
2 Vehicle body frame
11FL, 11FR, 11RL, 11RR Swing arm (F: Front (Fore), R: Rear (Rear), L: Left (Left), R: Right (Right))
12FL, 12FR, 12RL, 12RR Suspension
13FL, 13FR, 13RL, 13RR Wheel
14FL, 14FR, 14RL, 14RR Actuator
15FL, 15FR, 15RL, 15RR Self-weight support mechanism
16FL, 16FR, 16RL, 16RR Link
17FL, 17FR, 17RL, 17RR Support link
18FL, 18FR, 18RL, 18RR Spring
21FL, 21FR, 21RL, 21RR Spring
24FL, 24FR, 24RL, 24RR Spring
19FL, 19FR, 19RL, 19RR Link
22FL, 22FR, 22RL, 22RR Link
20FL, 20FR, 20RL, 20RR Frame
26FL, 26FR, 26RL, 26RR Guide
27FL, 27FR, 27RL, 27RR Guide
23FL, 23FR, 23RL, 23RR Wire
25FL, 25FR, 25RL, 25RR Pulley
100 Centroid of movement mechanism

What is claimed is:
1. A vehicle suspension system for a vehicle that has a vehicle body supported by wheels and is moved by driving the wheels, comprising:
a suspension that is connected to the vehicle body and a shaft mounted to the wheels;

an actuator that includes an output for vertically moving a suspension position of the suspension on the basis of inclination angle information of the vehicle; and a self-weight support mechanism that acts on the actuator to support vehicle weight, wherein the self-weight support mechanism is composed of a spring that is directly connected to the actuator, and a link mechanism that is connected to the suspension and that is directly connected to the actuator.

2. The vehicle suspension system according to claim 1, further comprising:

a support link connected to an intermediate portion of the link mechanism and one end of the vehicle body, wherein the actuator moves over a guide that is perpendicular to a direction of gravity.

3. The vehicle suspension system according to claim 1, wherein the actuator is movably embedded in a frame and the spring is mounted to one end of the frame and the actuator.

4. The vehicle suspension system according to claim 1, wherein:

one end of the link mechanism and the actuator are connected by a wire;

the actuator and the spring are connected by an end of the wire; and the actuator moves over a guide to thereby act on the suspension through the link mechanism connected to the wire.

5. The vehicle suspension system according to claim 1, wherein:

the self-weight support mechanism is connected to both the vehicle body and the suspension.

6. A vehicle suspension system for a vehicle that has a vehicle body supported by wheels and is moved by driving the wheels, comprising:

a suspension that is connected to a shaft mounted to the wheels;

an actuator that includes an output for vertically moving a suspension position of the suspension on the basis of inclination angle information of the vehicle; and a self-weight support mechanism that acts on the actuator to support vehicle weight between the vehicle body and the suspension, wherein the self-weight support mechanism is composed of a spring that is directly connected to the actuator, and a link mechanism that is connected to the suspension and that is directly connected to the actuator.

7. The vehicle suspension system according to claim 6, further comprising:

a support link connected to an intermediate portion of the link mechanism and one end of the vehicle body, wherein the actuator moves over a guide that is perpendicular to a direction of gravity.

8. The vehicle suspension system according to claim 6, wherein the actuator is movably embedded in a frame and the spring is mounted to one end of the frame and the actuator.

9. The vehicle suspension system according to claim 6, wherein:

one end of the link mechanism and the actuator are connected by a wire;

the actuator and the spring are connected by an end of the wire; and the actuator moves over a guide to thereby act on the suspension through the link mechanism connected to the wire.

10. The vehicle suspension system according to claim 6, wherein:

the self-weight support mechanism is connected to both the vehicle body and the suspension.

11. A vehicle suspension system for a vehicle that has a vehicle body supported by wheels and is moved by driving the wheels, comprising:

a suspension that is connected to the vehicle body and a shaft mounted to the wheels;

an actuator that includes an output for vertically moving a suspension position of the suspension on the basis of inclination angle information of the vehicle; and a self-weight support mechanism that acts on the actuator to support vehicle weight, wherein the self-weight support mechanism is composed of a spring mounted to the actuator, and a link mechanism that is connected to the suspension and the actuator, and the actuator is movably embedded in a frame and the spring is mounted to one end of the frame and the actuator.

* * * * *